United States Patent [19]

Kovalsky et al.

[11] Patent Number: 4,833,389
[45] Date of Patent: May 23, 1989

[54] CURRENT SOURCE INVERTER CONTROL SYSTEM FOR LOAD COMMUTATED INDUCTION MOTOR DRIVE

[75] Inventors: Leonard J. Kovalsky, Monroeville; Alberto Abbondanti, Plum Boro, both of Pa.

[73] Assignee: Westinghouse Electric Corp., Pittsburgh, Pa.

[21] Appl. No.: 249,737

[22] Filed: Sep. 26, 1988

[51] Int. Cl.$^4$ .......................... H02M 5/44; H02P 5/40
[52] U.S. Cl. ..................................... 318/803; 318/807; 363/37; 363/87; 363/96; 363/138
[58] Field of Search ................. 363/35, 37, 51, 85–88, 363/96, 128, 129, 135–138; 318/798–803, 807, 811

[56] References Cited

U.S. PATENT DOCUMENTS

| | | | |
|---|---|---|---|
| 4,315,305 | 2/1982 | Siemon | 363/37 |
| 4,420,719 | 12/1983 | D'Atre et al. | 318/803 |
| 4,426,611 | 1/1984 | Espelage et al. | 318/803 |
| 4,481,457 | 11/1984 | Zach et al. | 318/803 |
| 4,602,198 | 7/1986 | Weiss et al. | 318/798 |
| 4,620,296 | 10/1986 | Siemon | 363/37 |
| 4,697,131 | 9/1987 | Schauder et al. | 363/37 |
| 4,713,743 | 12/1987 | Abbondanti | 363/138 |

OTHER PUBLICATIONS

"The Synchronous Machine as a Self-Controlled Converter-Fed Motor", by Dieter Kollensperger in Siemens Review XXXV, (1968), pp. 195–201.

*Primary Examiner*—Peter S. Wong
*Attorney, Agent, or Firm*—C. M. Lorin

[57] ABSTRACT

In a load commutated induction motor drive stability is achieved in a runaway situation by generating in response to the motor speed reference signal a signal representative of the desired power factor angle and in using such signal to delay by that much the gating pulses controlling the current-sourced inverter.

3 Claims, 2 Drawing Sheets

CURRENT SOURCE INVERTER CONTROL SYSTEM FOR LOAD COMMUTATED INDUCTION MOTOR DRIVE

CROSS-REFERENCED PATENT APPLICATION

Reference is made to co-pending patent application Ser. No. 07/249,524, filed Sept. 26, 1988 which is hereby incorporated by reference.

FIELD OF THE INVENTION

The invention relates to control of Load Communicated Inverter (LCI) induction motor drives.

BACKGROUND OF THE INVENTION

Load Commutated Inverter (LCI) Synchronous Motor Drives using a thyristor inverter bridge do not need forced commutation means, because automatic thyristor turn-off is achieved with a synchronous motor as the load, if it has a leading phase angle with respect to the load voltage. For a given load, increasing sufficiently the field will produce such leading power factor. See, for instance:

"The Synchronous Machine as a Self-Controlled Converter-Fed Motor" by Dieter Kollensperger in Siemens Review XXXV (1968) No. 5, pp. 195–201;

U.S. Pat. No. 4,713,743 of Dec. 15, 1987 (Alberto Abbondanti).

With an induction motor, however, this possibility no longer exists. The load power factor is lagging for all machine excitation levels. Therefore, specific circuitry must be used to allow a leading phase angle to take place, thereby providing natural commutation of the inverter bridge. To this effect, a general solution is to add a large capacitor bank in parallel with the motor, so that the lagging load power factor be overcompensated, the net result being that leading VAR's are supplied to the composite load. Accordingly, the resultant leading power factor angle will insure natural commutation of the inverter poles. In such case, the motor drive is referred to as a Load Commutated Inverter Induction Machine (LCI/IM) drive. Thus, when the power factor of the induction motor has been overcompensated to produce a leading load power factor to a current source, in principle the induction motor behaves much like a synchronous motor as far as current source inverter (CSI) is concerned, for a significant speed range.

Traditional Current Source Control (CSI) method, used where the inverter bridge includes thyristors and forced-commutation is applied for an induction motor drive, consists in regulating the DC-Link current magnitude in order to achieve the desired motor voltage. Motor speed is regulated by imposing the desired switching upon the inverter. The desired motor voltage is maintained proportional to the imposed frequency. This prior art approach, however, has revealed problems of stability, particularly encountered at low speed. One solution to this problem, as typified by U.S. Pat. No. 4,602,198 of Herbert W. Weiss et al, has been to use in an LCI system a VAR generator in order to control the VAR supply. This is an expensive and complex approach to the problem.

The present invention bears uon the problem of stability encountered with a Load Commutated Inverter Induction Machine (LCI/IM) drive, i.e. one where the induction motor has a capacitor bank in parallel. The invention is based on the observation that, but for certain deviations which are minimal, the firing angle of the inverter in a CSI control loop is practically equal to the power factor angle on the output lines from the inverter to the load, i.e. the induction motor.

SUMMARY OF THE INVENTION

The problem of commutating the inverter thyristors, not encountered with a synchronous motor because of natural commutation, nor with an induction motor if the CSI control system includes forced-commutation, is solved with a LCI/IM drive by the use of a parallel capacitor bank. A problem of stability which attaches to it is solved, according to the present invention, by generating in response to the motor reference speed a signal representative of the desired power factor angle, and by using such power factor angle as a delay applied to the train of gating pulses normally used to control the LCI-/IM drive inverter.

DESCRIPTION OF THE INVENTION

Figure 1:
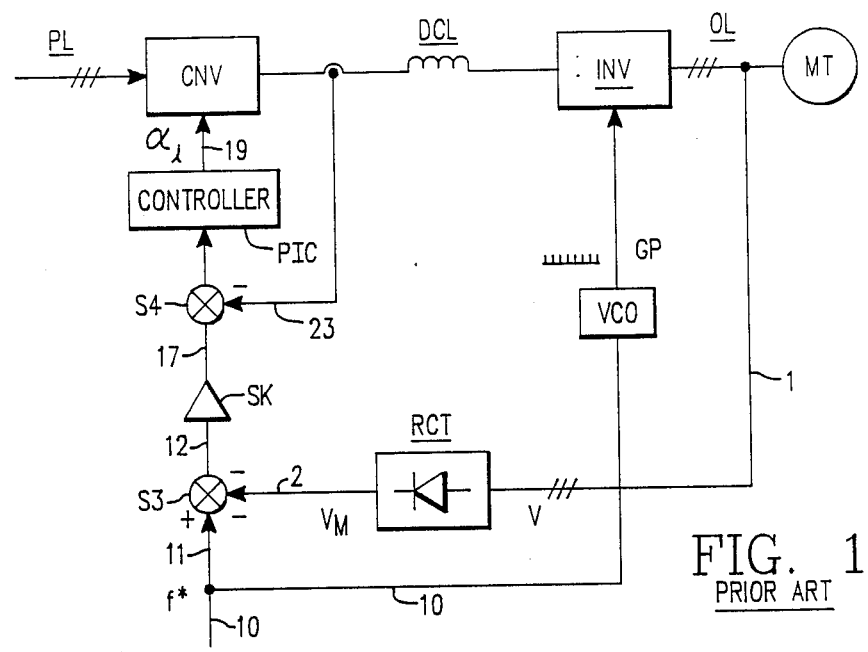
FIG. 1 shows in block diagram a typical CSI control for the converter and the inverter of a current source inverter as applied in the prior art to a motor, where natural commutation of the inverter is not required.

Referring to the conventional approach of CSI control as applied to a forced-commutation induction motor drive, the basic circuit is shown in FIG. 1. The AC power lines PL are inputted into a converter CNV which connects with a DC-link DCL. The DC-Link passes the DC current I onto an inverter INV generating AC power on output lines OL to the load. This is the well-known current-sourced inverter (CSI) which is supplying power to the induction motor MT at a frequency f determining the speed of the motor. The speed of the motor is controlled by a reference speed signal f* on line 10 actuating a variable frequency controlled oscillator (VCO) to produce a train of gating pulses GP at the imposed rate to the inverter. The torque also depends upon the DC-link current I. The latter is controlled by controlling the converter firing angle $\alpha_c$ on line 19 at the output of a P-I controller (PIC) operated in accordance with the difference (at S3) between the reference speed (lines 10 and 11) and a feedback signal VM derived on line 2 after rectification at RCT of the line voltages sensed by lines 2 from the output lines OL of the inverter. The signal of line 12 is scaled at SK and the output thereof, on line 17, is compared (at S4) with a DC-Link current feedback signal (line 23), then, processed by the PI Controlled (PI) so as to generate on line 19 a gating signal of desired firing angle $\alpha_c$ for the converter CNV. This loop regulates the DC-Link current I. The current is regulated to achieve a desired voltage, i.e. to increase the current when the voltage is too low, and conversely when the voltage is too high, whereas (at S3) a constant voltage-to-frequency ratio is being maintained (as expressed by the reference current of line 17).

When parallel capacitors are used for natural commutation (LCI approach) rather than forced-commutation, this method of CSI control becomes unsatisfactory. This is due to the self-exciting phenomenon of induction motors when parallel capacitors are present.

Figure 2:
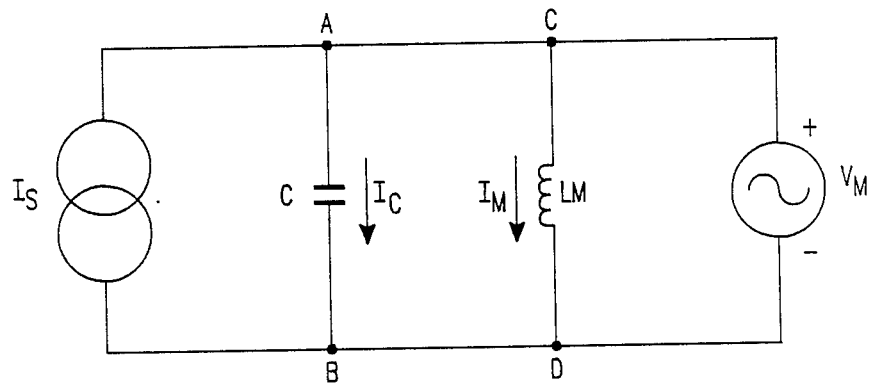
FIG. 2 is the model of a current source inverter.

Referring to FIG. 2 which shows a model of the current source inverter closed upon its load, to the left is the current source with the current IS, to the right is the motor with the reflected emf represented by the voltage Vm. Two parallel branches are in derivation, one capacitive C (from point A to point B), the other inductive Lm (from point C to point D), as generally known. Vm is proportional to motor speed and to the magnetizing current Im. The inverter produces the current source current Is which is independent of Vm.

Figure 2A:
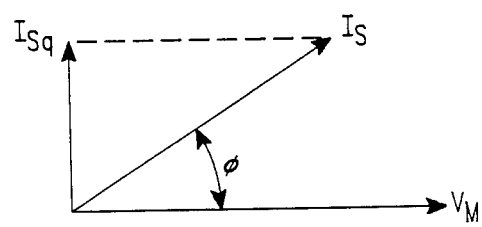
FIG. 2A is a vectorial representation of the stator current and of its quarature component relative to the emf vector of the motor in the case of the model of FIG. 2.

As shown in FIG. 2A, there is an angle $\phi$ between Is and Vm, Isq being the quadrature component of vector Is, and cos $\phi$ being the power factor on the load. In the induction motor drive, the values of C (the capacitor bank capacitance), and Lm (the motor's magnetizing inductance) are such that the magnitude of Ic (passing through the C branch of FIG. 2) exceeds that of Im for a given Vm. The capacitor may be viewed as consuming leading current, or alternatively, as supplying lagging current i.e. supplying magnetizing current for Lm. Since the supply of magnetizing current exceeds the demand of magnetizing current, Im will grow, which in turn will increase Vm, thereby increasing Ic, whereby the system will run away, this being limited only by saturation. If a conventional CSI control is used, current regulation will reduce Is to zero, but this will not remove the runaway condition.

In order to eliminate this drawback, it is proposed that the inverter provide an imaginary component Is (FIG. 2A) such as to cancel the excessive magnetizing current from the system. This is equivalent to injecting the required amount of leading current into the system. The real component of Is is consumed by the motor to do work. The component which is critical in producing a stable system is the quadrature component Isq, related to Ic and Im.

The equations describing the model of FIG. 2 are as follows:

| Ic = | $j\omega C V_m$ |
| Im = | $V_m/j\omega L_m = -jV_m/\omega L_m$ |
| Isq = | Is sin $\phi$ | where cos $\phi$ is the power factor at the CSI output terminals (OL), defined by the angle $\phi$ of Is relative to Vm.

In order to cancel the inherent self-exciting phenomenon, Isq must be such as to cancel the excessive magnetizing current supplied by Ic. If this is the case the following is true:

| Isq = Ic + Im | (3) |
| Isq = Vm ($\omega C - [1/\omega L_m]$) | (4) |

From these two equations is derived an angle $\phi$, which defines the power factor cos $\phi$. Thus:

$$\phi = \sin^{-1}\{(V_m/I_s)[\omega C - (1/\omega L_m)]\} \qquad (5)$$

It appears that Vm is a function of motor speed, while Is is a function of motor load. For a given motor load, Is is essentially constant. Therefore, given the motor speed, Vm and are known, and $\phi$ is determined by the afore-stated function. More generally, in a given application such as flow control, Is can be predicted as a function of the imposed speed. In conclusion, $\phi$ is determined as a function of the reference speed f*.

Figure 3:
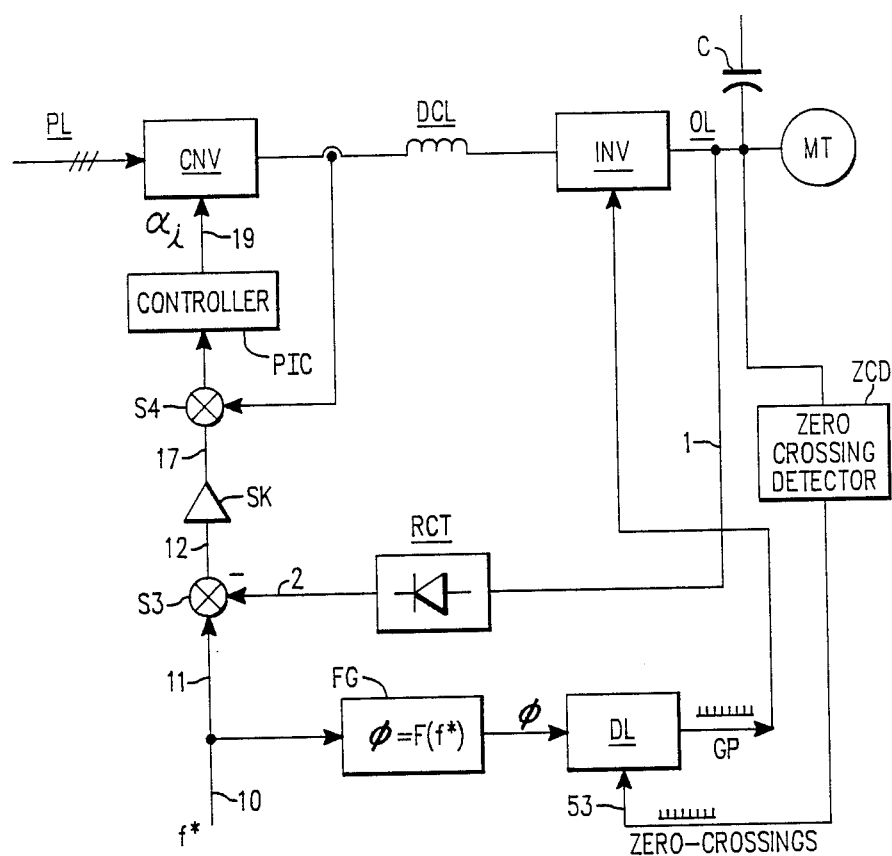
FIG. 3 is a block diagram of the CSI control system according to the present invention, as can be used for a load commutated inverter (LCI) induction motor drive.

Referring to FIG. 3, the current source inverter (CSI) control for a Load Commutated Inverter Induction Motor (LCI/IM) drive, according to the present invention, is illustrated in block diagram as a direct modification of the circuit of FIG. 2. A function generator FG is added responding to the reference frequency of lines 10 and 50 and outputting on line 51 a signal representative of the desired power factor angle $\phi$. The signal of line 51 is thereafter applied to a delay circuit DL which is interposed upon the series of pulses derived on line 53 from a zero-crossing detector (ZCD) having its input connected to the output lines OL of the inverter. Accordingly, are generated on line 54 at the output of delay circuit DL, gating pulses GP for the inverter, having the required phasing angle $\phi$. Therefore, the signal of line 51 insures that, whatever the load condition and the occurrence of the pulse of line 10 which is imposed by the frequency reference signal f*, firing will occur so that it matches the power factor angle, and the quadrature component of current will exist to prevent the runaway condition.

The implementation of block FG is according to the afore-stated function F defining the angle $\phi$. The angle $\phi$ is preprogrammed in a PROM as a function of the reference frequency f* addressing the PROM from line 50. The function so implemented is to impose an inverter firing instant that will cause the current impressed on the load to lead the voltage by $\phi$ degrees. Thus, the power factor cos $\phi$ is implemented by requiring a delay in the application of the gating pulses to the inverter, thereby forcing a quadrature component of the current to be formed which will reestablish a balance between the capacitive current and the magnetizing current within the current-sourced inverter model. In other words, the added loop including function generator FG and the power factor angle controlled delay DL, has been added to correct the train of inverter gating pulses, normally received from the zero-crossing detector ZCD by line 53.

We claim:

1. In a Load Commutated Inverter Induction Motor (LCI/IM) drive including: an AC power supply, a converter for converting said power supply into DC current, an inverter coupled through input lines to the motor, a DC-link between said converter and said inverter, and a bank of capacitors in parallel with the motor; first means being provided for controlling said converter in relation to the voltage of said output lines and to a speed reference signal; and second means being provided responsive to said speed reference signal for generating and applying gating pulses to said inverter; the combination of:

third means responsive to said speed reference signal for generating a signal representative of the power factor angle on said output lines; and fourth means responsive to said output lines for generating zero-crossing characteristic signals in accordance with the voltages on said output lines;

said gating pulses being provided by said zero-crossing signals and being delayed in the amount of said power factor representative signal.

2. The LCI/IM drive of claim 1 with said third means being a function generator calculating the function $\phi = F(f^*)$, where $\phi$ is the power factor angle, $f^*$ is the speed reference signal, and F is a function given by the equation:

$$\phi = \sin^{-1}\{(Vm/Is)[\omega C - (1/\omega Lm)]\}$$

Vm being the emf of the motor, $\omega Lm$ the magnetizing reactance of the model of the motor drive, and C the parallel capacitance across the motor.

3. The LCI/IM drive of claim 1 with said third means being a lookup table means having stored therein the values of the power factor angle $\phi$ as a function of f* the frequency of the AC power supply, said lookup table being addressed by said speed reference signal.

* * * * *